United States Patent [19]
Habich et al.

[11] Patent Number: 5,479,429
[45] Date of Patent: Dec. 26, 1995

[54] LASER CAVITY FOR LASER MEDIA WITH ANNULAR CROSS SECTION

[75] Inventors: Uwe Habich; Keming Du, both of Aachen; Heinz-Dieter Plum, Aachen-Haaren, all of Germany

[73] Assignee: Fraunhofen Gesellschaft zur Forderung der Angewandten Forschung e.V., Munich, Germany

[21] Appl. No.: 983,532

[22] Filed: Apr. 14, 1994

[30] Foreign Application Priority Data

Sep. 5, 1990 [DE] Germany .......................... 40 28 170.1

[51] Int. Cl.⁶ ........................... H01S 3/06; H01S 3/07
[52] U.S. Cl. ........................... 372/66; 372/99; 372/108
[58] Field of Search ........................ 372/66, 99, 108

[56] References Cited

U.S. PATENT DOCUMENTS

| | | | |
|---|---|---|---|
| 4,050,036 | 9/1977 | Chambers et al. | 331/94.5 C |
| 5,373,525 | 12/1994 | Nowack et al. | 372/99 |

Primary Examiner—Rodney B. Bovernick
Assistant Examiner—Robert E. Wise
Attorney, Agent, or Firm—Antonelli, Terry, Stout & Kraus

[57] ABSTRACT

A laser resonant cavity for utilizing media, having an annular cross section as well as two end mirrors. The end mirrors exhibit a toroidal surface, and at least one end mirror has at least one aperture through which the laser beam can be coupled out.

14 Claims, 6 Drawing Sheets ately over-diffraction to be ruled-out possible to tilt the two mirrors so that the two beam bundles...

LASER CAVITY FOR LASER MEDIA WITH ANNULAR CROSS SECTION

FIELD OF ART

The invention relates to a laser cavity for laser media with annular cross section, as well as two end mirrors.

STATE OF THE ART

In laser systems, the amplifying media of which have a cylindrical shape, simple resonant cavities can be utilized made up of planar and/or spherical mirrors.

However, in a number of laser systems, the use of cylindrical media is impossible or not indicated. Such laser systems are, for example, gas lasers with a coaxial electrode arrangement, solid state lasers with an axial pumping light source, liquid (dye) lasers with an axial pumping light source, etc. Moreover, in some cases the use of media having an annular cross section is of advantage with regard to compactness and price.

A number of suggestions have thus far become known for laser cavities in order to utilize media with an annular cross section, but none of these proposals is completely satisfactory:

A $CO_2$ laser has been disclosed in DE 35 15 679 C1 wherein the annular resonant cavity consists of four mirror elements, two cavity end mirrors as well as two multipass mirrors. In this case, spherical mirrors are employed as the multipass mirrors to illuminate the active medium.

However, this known cavity has drawbacks with regard to beam overlapping of the active medium, and thus with respect to the total degree of efficiency.

Further cavities for exploiting media with annular cross section are described in U.S. Pat. No. 4,050,036 and also in a series of articles from "Applied Optics". Attention is invited, merely as examples, to volume 12, pages 1940 et seq. and volume 15, pages 2137 et seq.

These resonant cavities exhibit the same disadvantage as the cavity known from DE 35 15 679 C1 and/or are if such a complicated structure that their manufacture is expensive and, respectively, their adjustment is difficult.

DESCRIPTION OF THE INVENTION

The invention is based on the object of indicating a laser cavity of a simple structure for laser media with an annular cross section as well as two end mirrors wherein the degree of efficiency is increased as compared with conventional lasers by an improved beam overlapping of the laser medium.

In accordance with the invention, the end mirrors have a toroidal surface, and at least one end mirror has at least one aperture through which the laser beam can be coupled out.

In coaxial waveguide lasers, ring-shaped planar mirrors can be utilized in place of torus mirrors since the radiation field is conducted in the radial direction through the boundary of the medium.

The invention herein starts with the basic idea that the energy transport of the radiation to the coupling-out aperture in the annular-gap-shaped cavity volume takes place by diffraction. A radiation field with an annular cross section is formed between the torus mirrors. By the aperture in one of the mirrors, the intensity of the radiation field is greatly reduced at this location. This portion of the cavity yields substantially smaller diffraction contributions into the neighboring regions than those diffracted from there into the aperture. The intensity in the surroundings of the aperture is thereby likewise lowered so that, by diffraction, a net energy transport takes place from all regions of the cavity to the coupling-out aperture.

The structure according to this invention can be utilized in any desired lasers, regardless of whether these lasers employ solid, liquid or gasous media, and makes it possible to effectively exploit such annular media.

Also, more than one aperture can be used.

The mutual alignment of the end mirrors can exhibit a tilting angle deviating with respect to the parallel orientation so that the "diffraction loss", and thus the coupling out of power, can be amplified in a controlled fashion.

In this connection, it is possible, in particular, to tilt the two mirrors so that the two beam bundles approach the coupling-out aperture in the opposite direction of rotation. Consequently, two closely juxtaposed, divergent output beams are obtained which can optionally be oriented in "parallel" by an optical element, such as a prism.

However, it is, of course, likewise possible for the center circles of curvature of the two torus mirrors to define a cylindrical axis extending in the laser medium.

BRIEF DESCRIPTION OF THE DRAWINGS

The invention will be described hereinbelow by way of example, using embodiments with reference to the drawings, wherein.

DESCRIPTION OF EMBODIMENTS

Figure 1A:
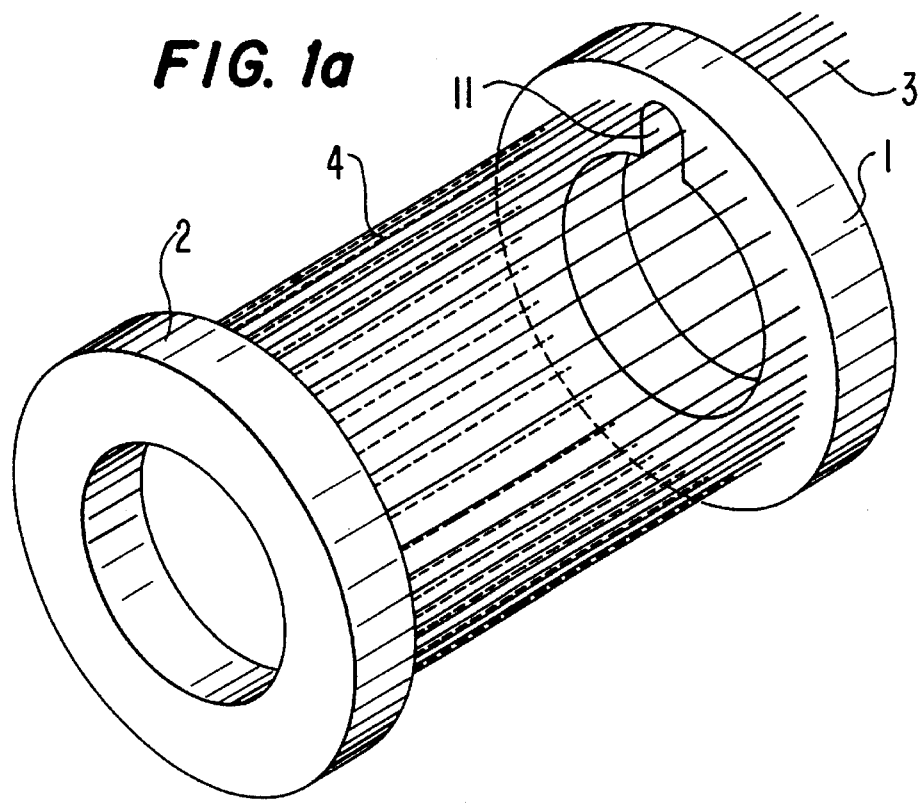
FIGS. 1a–1c show various embodiments of a laser cavity according to this invention.

FIG. 1a illustrates a laser cavity for a laser medium, not shown, with an annular cross section. The laser cavity comprises two end mirrors 1 and 2 having a toroidal mirror surface described in greater detail in the cross-sectional view of FIG. 1d and not shown in FIGS. 1a–1c or in FIGS. 4 and 5.

In the embodiment illustrated in FIG. 1a, the end mirror 1 has an aperture 11 through which a laser beam 3 can be coupled out. Numeral 4 indicates schematically the beam path between the end mirrors 1 and 2.

Figure 1B:
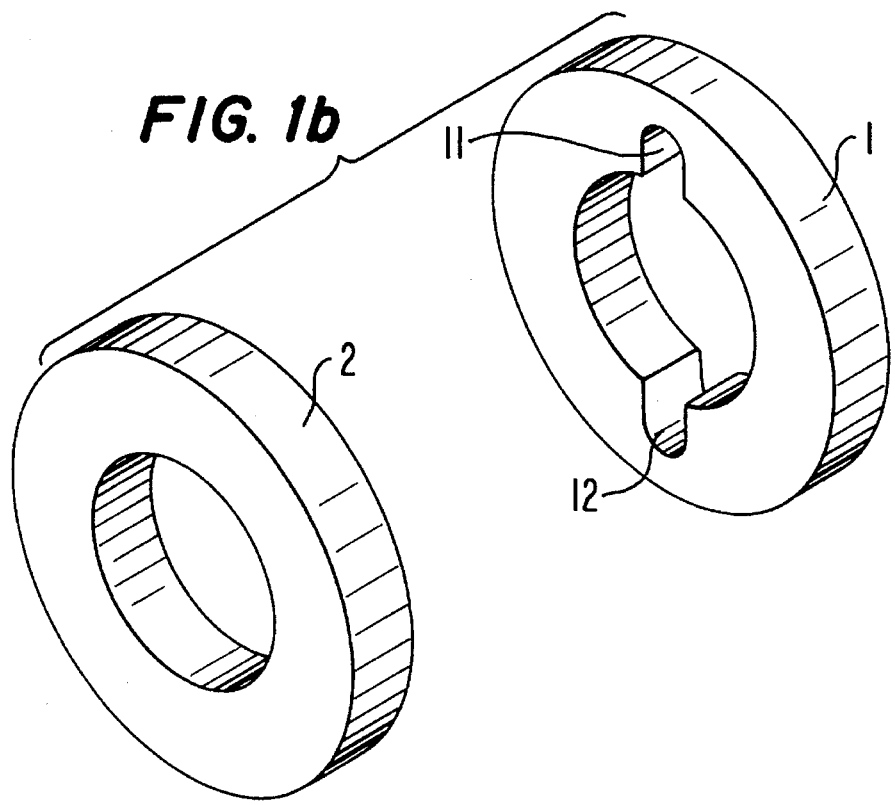
Figure 1C:
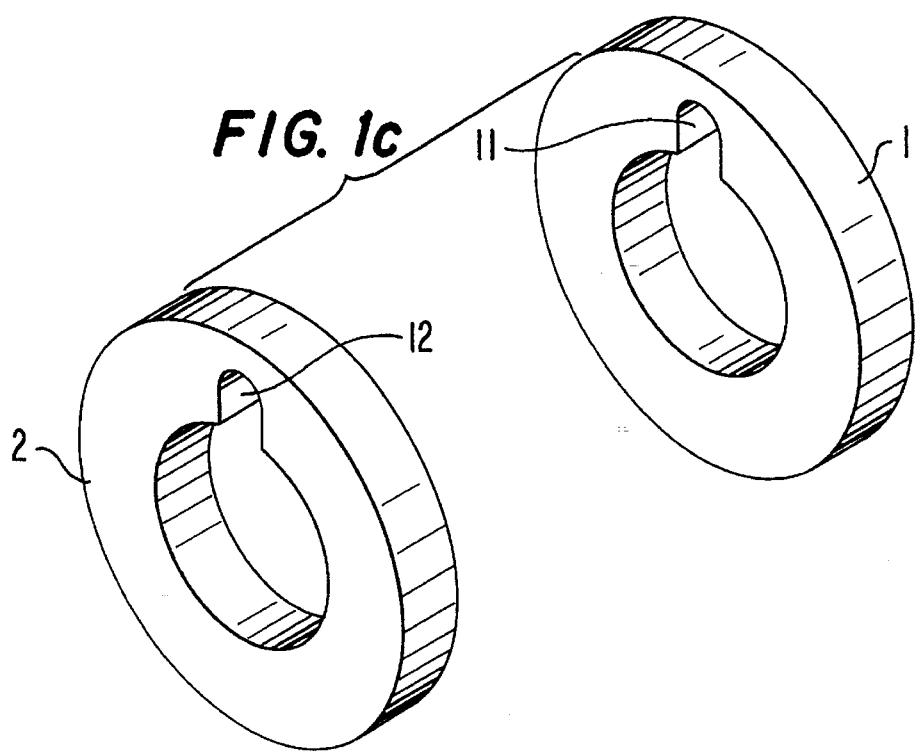

In the following figures, identical or corresponding parts are in each case denoted by the same reference numerals so that a repetition of the description is avoided, and merely the deviations of the embodiments shown in these figures as compared with the first embodiment are described:

FIG. 1b shows an embodiment wherein the end mirror 1 has two coupling-out apertures 11 and 12, whereas FIG. 1c shows an embodiment wherein each end mirror 1 and 2 has one coupling-out aperture 11 and 12, respectively.

Figure 1D:
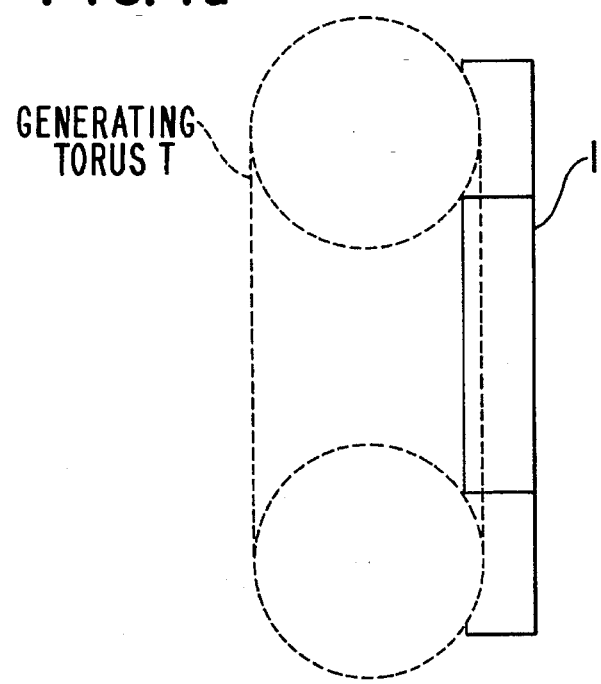
FIG. 1d shows a cross section through a laser end mirror utilized in the embodiments according to FIGS. 1 and 3–5.

FIG. 1d shows a laser end mirror 1 in cross section, the reflective laser surface of this mirror having a toroidal configuration. To make this surface characteristic clear, a torus T, generating the mirror surface, is indicated in dotted lines. For the sake of simplifying the drawings, FIGS. 1a, 1b, 1c, 4 and 5 do not show the toroidal mirror shape but rather show a planar mirror surface which can be better illustrated.

Figure 2:
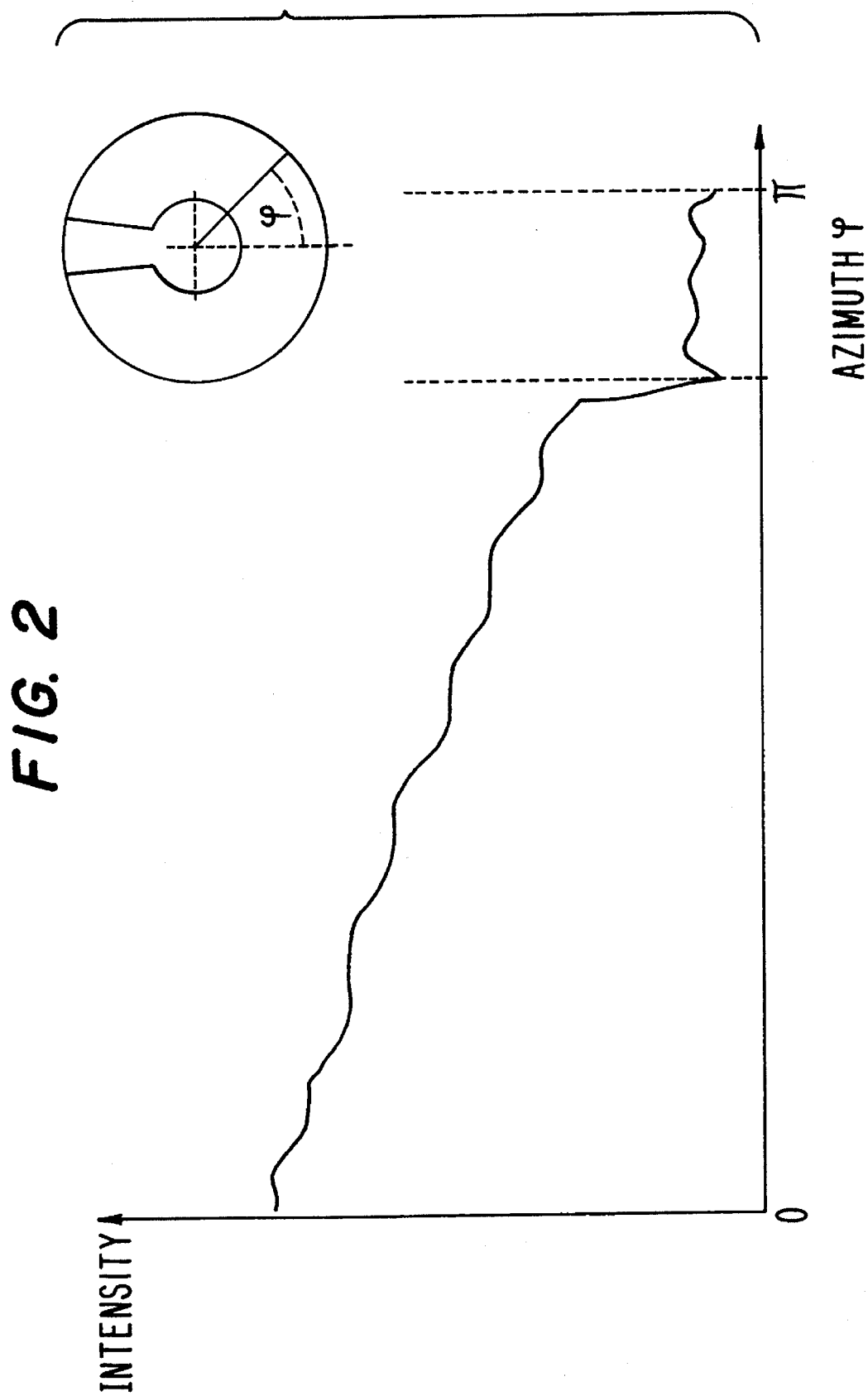
FIG. 2 shows schematically the intensity curve.

FIG. 2 shows schematically the intensity curve in dependence on the azimuth angle. The output beam thus represents an additional diffraction "loss".

Figure 3:
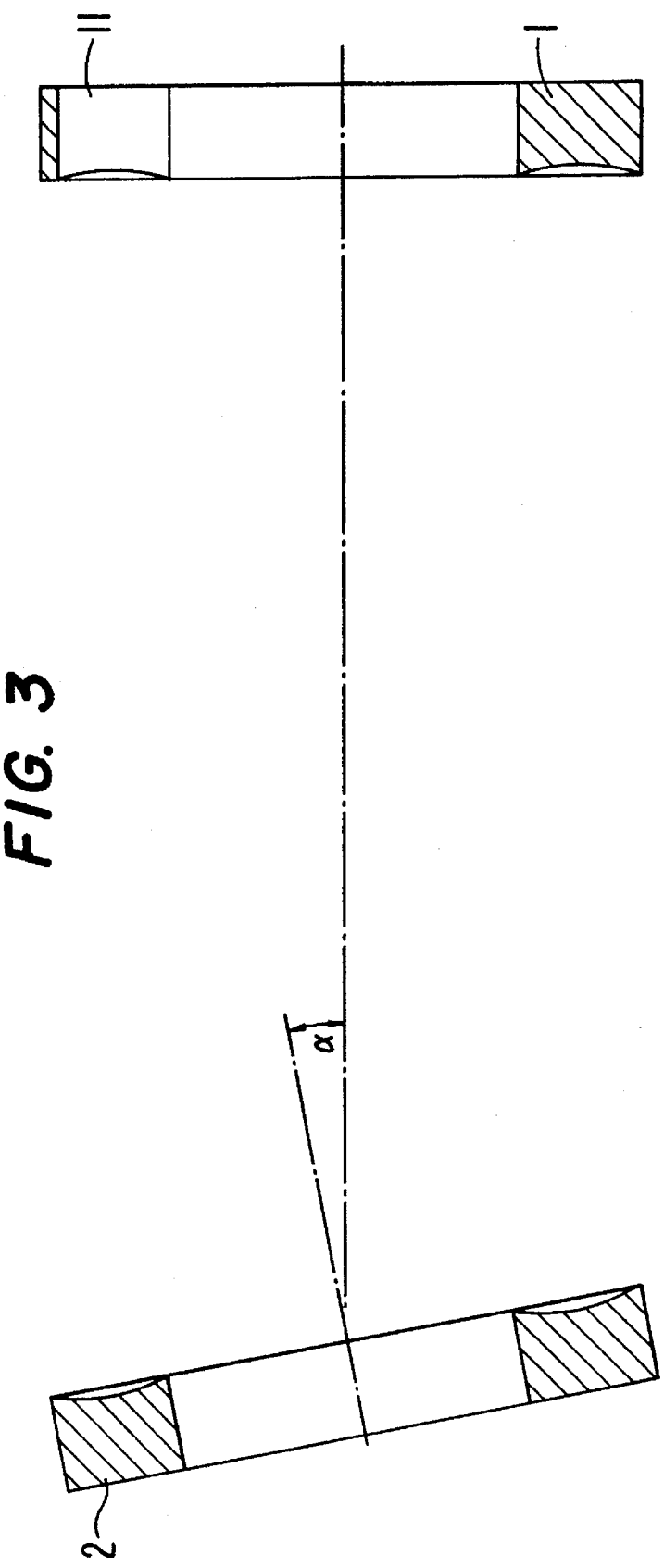
FIG. 3 shows an embodiment with tilted mirrors.

This diffraction loss can be intentionally amplified by tilting the mirrors 1 and 2 (FIG. 3) so that an effective coupling out of power results. This increase in the diffraction losses brought about by tilting results, in the known cavities, in a reduction in laser power and therefore is undesirable. In this instance, the increase leads to an optimization of the coupled-out power.

Furthermore, in the illustrated embodiments, the center circles of curvature of the torus mirrors are chosen so that the thus-defined cylindrical "optical axis" in the amplifying medium is placed in such a way that the losses are minimized and utilization of the medium is optimized.

Further, the cavity structure according to this invention makes it possible to provide a great diversity of modifications providing various beam exit forms:

Thus, for example, generally two laser beams are coupled out by the use of rotationally symmetrical mirrors which do not provide a preferential direction for the beam path.

Figure 4:
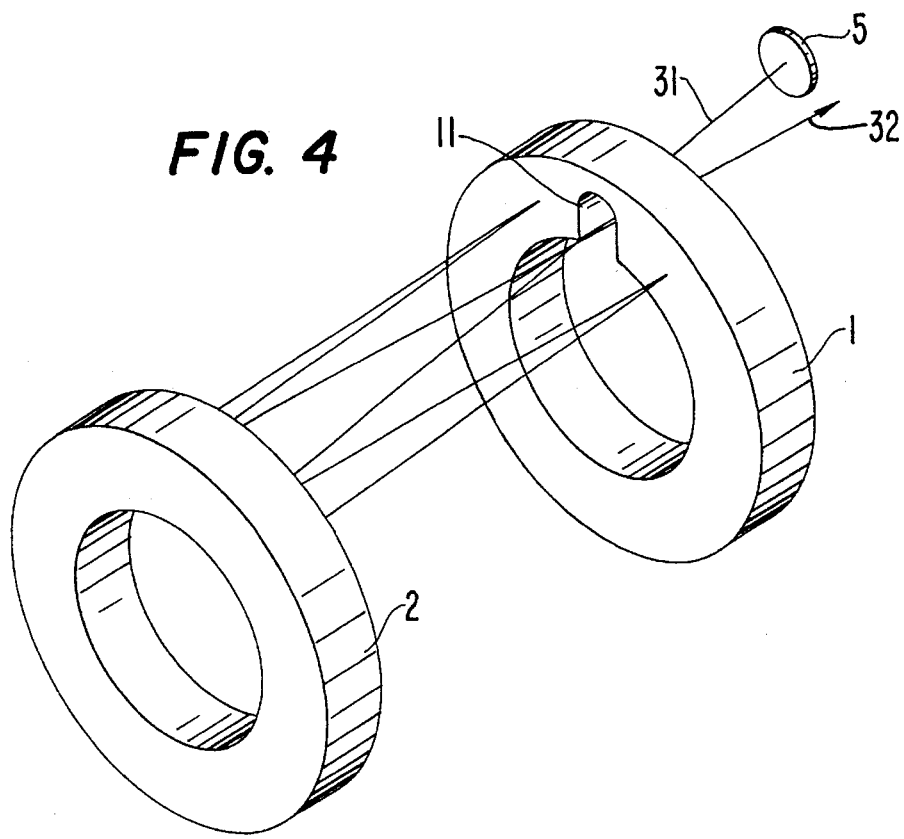
FIGS. 4 and 5 show further embodiments.

FIG. 4 shows an embodiment wherein two divergent component beams 31 and 32 are produced, of which the beam 31, after the exit aperture 11 in the mirror 1, is reflected into itself by a fully reflecting mirror 5.

As a further possibility, the cavity mirrors can be tilted so that two beam bundles travel symmetrically toward the coupling-out aperture in the opposite sense of rotation. This leads to two closely juxtaposed but divergent output beams. Also, the objective can be attained that only one beam bundle passes within a full revolution to the coupling-out aperture. Thereby, only a single output beam is produced.

Figure 5:
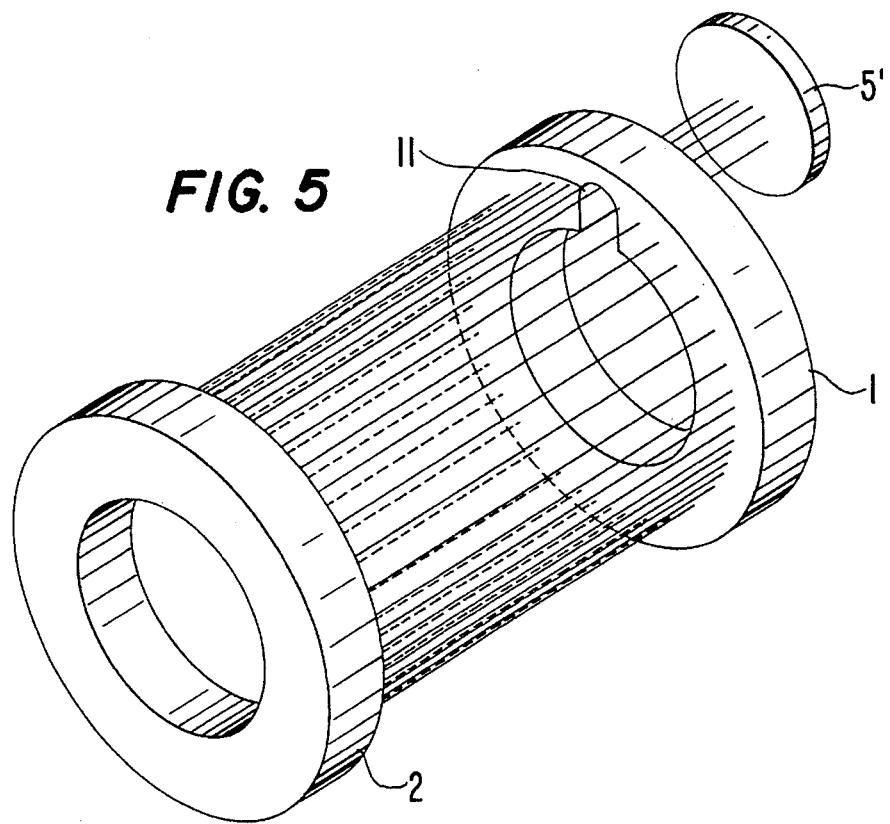
Figure 6A:
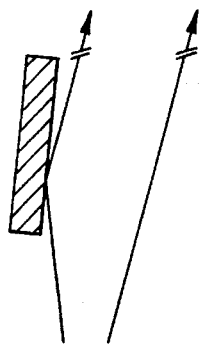
FIGS. 6a–6d show optical elements for the parallel guidance of divergent beams.
Figure 6B:
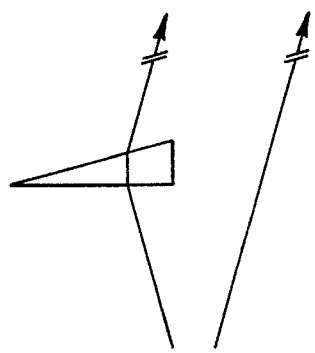
Figure 6C:
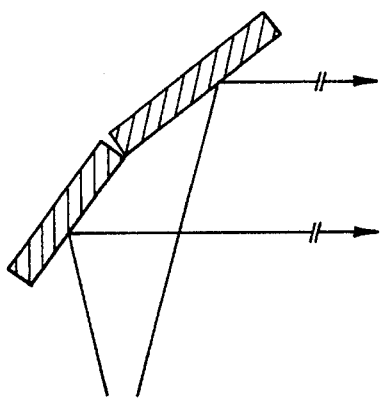
Figure 6D:
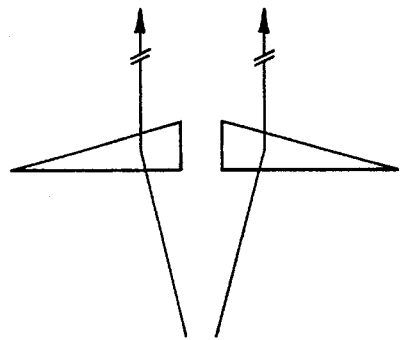

FIG. 5 shows an embodiment wherein a partially transmissive mirror 5' for subjecting a portion of the laser power to feedback is provided adjacent in the coupling-out aperture 11. With adequately long amplification paths, the amplified spontaneous emission suffices for the effective utilization of the medium.

FIG. 6 represents possible modifications of optical elements suitable for parallel guidance of divergent rays. Thus, it is possible to use simple mirrors for the deflection of one beam (FIG. 6a) or for the deflection of two beams (FIG. 6c), as well as refracting prisms (FIGS. 6b, 6d) for such a beam guidance.

The invention has been described above with reference to embodiments for explaining the general idea of the invention disclosed in the claims. The individually described features can, of course, also be combined, or in part represent independent solutions.

We claim:

1. A laser cavity for laser media, comprising a first annular end mirror; and a second annular end mirror facing said first annular end mirror to define the laser cavity, each of the end mirrors having a concave reflecting surface facing the other one of the end mirrors, at least one end mirror having an aperture therethrough out of which the laser beam can be coupled.

2. A laser cavity according to claim 1, wherein, with respect to the laser light, the energy transport to the coupling-out aperture in the laser cavity takes place by diffraction.

3. A laser cavity according to claim 1, wherein the concave reflecting surfaces of said end mirrors are defined by a toroidal surface.

4. A laser cavity according to claim 1, 2, or 3, wherein the mutual alignment of the end mirrors has a tilting angle deviating with respect to the parallel orientation.

5. A laser cavity according to claim 4, further comprising an optical element for aligning the divergent output beams in parallel.

6. A laser cavity according to claim 5, wherein said optical element is reflective or refractive.

7. A laser cavity according to claims 1, 2, or 3, wherein the center circles of curvature of said end mirrors define a cylindrical axis extending in the laser medium.

8. A laser cavity according to claims 1, 2 or 3, wherein the two end mirrors can be adjusted so that they generate a multipass beam path.

9. A laser cavity according to claim 1, 2, or 3, wherein said at least one of said end mirrors has two apertures therethrough.

10. A laser cavity for laser media, comprising a first annular end mirror having a concave reflecting surface defined by a toroidal surface; a second annular end mirror having a planar reflecting surface facing the concave reflecting surface of said first annular end mirror to define the laser cavity, said second end mirror having an aperture therethrough out of which the laser beam can be coupled.

11. A laser cavity according to claim 10, wherein said second end mirror has two apertures therethrough.

12. A laser cavity according to claims 1, 2, 10 or 3, wherein each of said end mirrors has an aperture therethrough.

13. A laser cavity according to claim 1, 2, 10 or 3, further comprising a third end mirror in the beam path after said aperture.

14. A laser cavity according to claim 1, 2, 10, or 3, wherein only one beam bundle passes in a full rotation to the coupling-out aperture.

* * * * *

UNITED STATES PATENT AND TRADEMARK OFFICE
CERTIFICATE OF CORRECTION

PATENT NO.  : 5,479,429
DATED       : Dec. 26, 1995
INVENTOR(S) : HABICH, et al

It is certified that error appears in the above-identified patent and that said Letters Patent is hereby corrected as shown below:

On the title page: Item

[75] Inventors:  Uwe Habich; Keming Du, both of Aachen; Axel Bauer, of Eupen; Heinz-Dieter Plum, of Aachen-Haaren; Peter Loosen, of Aachen, all of Germany Signed and Sealed this Ninth Day of July, 1996

Attest:

BRUCE LEHMAN

*Attesting Officer*           *Commissioner of Patents and Trademarks*